(12) United States Patent
Tominaga et al.

(10) Patent No.: US 7,742,513 B2
(45) Date of Patent: Jun. 22, 2010

(54) FIBER LASER MODULATION METHOD AND MODULATOR

(75) Inventors: Keisuke Tominaga, Tokyo (JP); Kanji Tanaka, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 137 days.

(21) Appl. No.: 11/550,110

(22) Filed: Oct. 17, 2006

(65) Prior Publication Data

US 2007/0147441 A1 Jun. 28, 2007

(30) Foreign Application Priority Data

Oct. 18, 2005 (JP) .............................. 2005-303265

(51) Int. Cl.
*H01S 3/30* (2006.01)
*H01S 3/13* (2006.01)
*H01S 3/00* (2006.01)

(52) U.S. Cl. .................... 372/38.02; 372/6; 372/29.014

(58) Field of Classification Search ..................... 372/6, 372/29.014, 38.02
See application file for complete search history.

(56) References Cited

U.S. PATENT DOCUMENTS

| | | | | |
|---|---|---|---|---|
| 6,301,271 | B1 * | 10/2001 | Sanders et al. ................. 372/3 |
| 7,068,691 | B2 * | 6/2006 | Chujo et al. .............. 372/38.02 |
| 2002/0009110 | A1 * | 1/2002 | Inoue et al. .............. 372/38.04 |
| 2004/0052278 | A1 * | 3/2004 | Kane et al. ..................... 372/25 |
| 2004/0174916 | A1 | 9/2004 | Chujo et al. |
| 2004/0233948 | A1 * | 11/2004 | Quinn et al. ............. 372/38.02 |

FOREIGN PATENT DOCUMENTS

| | | |
|---|---|---|
| JP | 01-048481 | 2/1989 |
| JP | 5-129695 | 5/1993 |
| JP | 3411852 | 3/2003 |

* cited by examiner

*Primary Examiner*—Uyen-Chau N Le
*Assistant Examiner*—John M Bedtelyon
(74) *Attorney, Agent, or Firm*—Oblon, Spivak, McClelland, Maier & Neustadt, L.L.P.

(57) ABSTRACT

A pattern generator 2 produces a predetermined pattern signal 11 which is an electric signal, and a LD output light 12 of light signal is produced by inputting the pattern signal 11 to a plurality of semiconductor lasers (LD) 3 as a pump light source. To make a output light 14 to be a pulsed light not following a surge pulse rectangular, a fiber laser modulator 1 is configured that the pattern signal 11 generated by a pattern generator 2 includes four phases power level: low powered phase, power rising phase, high power phase and power decreasing phase.

10 Claims, 5 Drawing Sheets

FIBER LASER MODULATION METHOD AND MODULATOR

BACKGROUND OF THE INVENTION

1. Field of the Invention

This invention relates to a technical field of a fiber laser modulation method for modulating the input light to an amplifying optical fiber to output the predetermined output light, a fiber laser modulator.

2. Description of the Related Art

Recently, laser light (pulsed light) is applied to a variety of fields, for example a optical communication field where a pulsed light is used as a signal, and a processing field where the pulsed light is irradiated to an object. And as a laser light generating means, for example a generating means using a YAG laser which is employed in a laser marking device is conventionally known.

The laser marking device employing the YAG laser and the like has problems in that the size of the device is entirely getting larger and the mainteinability is deteriorated due to complicated optical system. Hence, a fiber laser technique where a rare-earth element doped optical fiber, such as Yb in substitution for YAG laser is used as the amplifying medium, is conventionally disclosed in the patent document 1 (Japanese Patent No. 3411852).

As a method for generating the pulsed light by fiber laser, conventionally rectangular input signals are input to the predetermined pump light source to generate pump light, and then the pump light is input to the predetermined amplifying medium to produce pulsed light. In this case, surge pulse was generated in the produced pulsed light on pulse rise time.

In order to use the pulsed light for such as the light source of the display, pulsed light having the rectangular waveform not following the surge pulse is required. Also, not only the light source for display, but also for example the light source of various analyzing devices, the rectangular pulsed light not following the surge pulse is required.

However, in the conventional pulsed light producing method using the fiber laser, the rectangular pulsed light not following the surge pulse could not be produced. Therefore, using the laser light as the light source for the display is very difficult, which limits the applicable scope of the laser light.

In order to use the laser light as the light source for the display, three primary colors, red, blue and green laser lights are required. Of these, each semiconductor laser for irradiating red and blue has been in practical use, but the semiconductor laser for irradiating green has not been implemented the practical use.

Although a light source capable of producing green light in place of the semiconductor laser is strongly desired, the use of the amplifying optical fiber couldn't produce the rectangular pulsed light not following the surge pulse as described above.

BRIEF SUMMARY OF THE INVENTION

The object of the present invention is to provide a fiber laser modulation method for optimizing an input pattern of a pump light source to produce a rectangular pulsed light not following a surge pulse and a modulator to solve above-mentioned problems.

A first aspect of a fiber laser modulation method according to the present invention comprises steps of forming a pattern of the input light in a power level of four phases including a low powered phase, a power rising phase, a high power phase and a power decreasing phase, setting a power level of the high power phase as a predetermined high power level such that the output light is determined to match with a predetermined required power level, setting a power level of the low powered phase so as to be greater than zero and such that a predetermined low power level is determined that the output light is equal to or less than predetermined threshold, rising the power level of the power rising phase at an status between the low power level and the high power level in a predetermined rising rate, and decreasing the power level of the power decreasing phase at an status between the high power level and the low power level in a predetermined decreasing rate.

It is preferable that, in a second aspect of a fiber laser modulation method according to the present invention, the power level of the power rising phase is increased from the low power level to the high power level in a certain rising rate.

It is preferable that, in a third aspect of a fiber laser modulation method according to the present invention, a predetermined medium power level which is higher than the low power level as well as lower than the high power level is set, the power level of the power rising phase is raised from the low power level to the medium power level in a certain rising rate, at an end of the power rising phase, is steppedly raised from the medium power level to the high power level.

It is preferable that, in a fourth aspect of a fiber laser modulation method according to the present invention by inputting the output light to an SHG element (Second Harmonic Generation element), a wavelength of the output light is decreased to be a half while making the power level in the low powered phase to be substantially zero.

It is preferable that, in a fifth aspect of a fiber laser modulation method according to the present invention the above-mentioned output light has rectangular waveform.

It is preferable that, in a sixth aspect of a fiber laser modulation method according to the present invention, the output light is a pulsed light having the low powered phase, the power rising phase, the high power phase and the power decreasing phase as one cycle.

A first aspect of a fiber laser modulator according to the present invention comprises a pattern generator for producing a input pattern including a low powered phase, a power rising phase, a high power phase and a power decreasing phase, a pump light source for outputting pump light by inputting the input pattern from the pattern generator, a first FBG (Fiber Bragg Grating) for permitting the pump light to pass from the pump light source while reflecting an amplifying light from an opposite direction, an amplifying optical fiber for outputting the amplifying light of a predetermined wavelength, by excitement due to the pump light which is input through the first FBG, a second FBG for permitting a part of the amplifying light irradiated from an amplifying optical fiber to pass and then reflecting rest of the light, and a fiber outputting element for outputting the amplifying light passed through the second FBG to outside.

A second aspect of a fiber laser modulator according to the present invention further includes a SHG element, and the output light from the fiber outputting element is input to the SHG element, the light having half wavelength of the output light and substantially zero power level in the low powered phase is output.

It is preferable that, in a third aspect of a fiber laser modulator according to the present invention, the above-mentioned pump light source is a semiconductor laser for generating a laser light with a wavelength of from 900 to 1000 nm.

It is preferable that, in a fourth aspect of a fiber laser modulator according to the present invention, the above-mentioned amplifying optical fiber is a double clad fiber with at least one of Yb, Er and Nd doped.

It is preferable that, in a fifth aspect of a fiber laser modulator according to the present invention, the output light form the above-mentioned SHG element is a green light.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE INVENTION

Figure 1:
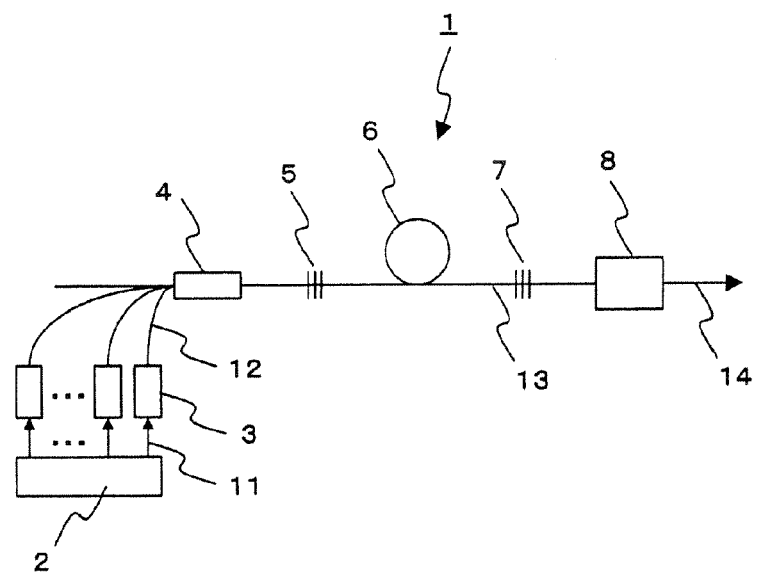
FIG. 1 is a block diagram showing a structure outline of a fiber laser modulator 1 with respect to the embodiment of the present invention.

Detailed description of the fiber laser modulation method and the structure of the modulator in the preferred embodiment of the present invention are provided with reference to the drawings. Each component having same function will be given same reference numeral to facilitate illustration and description.

FIG. 1 is a block diagram showing a structure outline of a fiber laser modulator 1 with reference to the present invention.

In a fiber laser modulator 1 shown in FIG. 1, first predetermined pattern signal 11 which is an electric signal is produced by a pattern generator 2, and the pattern signal 11 is input a plurality of semiconductor lasers (LD) 3 which are a pump light source to generate LD output light 12 of the light signal.

The LD output light 12 generated by the plurality of semiconductor laser 3 is multiplexed by a TFB (Tapered Fiber Bundle) 4 to be one, and then input to an amplifying optical fiber 6 after passing a first FBG (Fiber Bragg Grating) 5. When the LD output light 12 is input to the amplifying optical fiber 6, laser resonator is formed between the first FBG (Fiber Bragg Grating) 5 and a second FBG (Fiber Bragg Grating) 7, and an amplified laser light 13 with amplified predetermined wavelength (hereinafter, amplified light 13) is output from the second FBG (Fiber Bragg Grating) 7.

As the amplifying optical fiber 6, for example Yb doped double clad fiber may be used. In this case, a semiconductor laser that emits the light with a wavelength from 900 nm to 1000 nm in the absorption band of the Yb ion is used as the semiconductor laser 3. The wavelength with especially good absorption efficiency is 915 nm or 975 nm, so that using a semiconductor laser locating near the wavelength implements good excitation efficiency.

In this case, the amplified light 13 output from the second FBG can be optionally selected from 1000 nm to 1150 nm that has the light amplification benefit of the Yb ion due to wavelength characteristics of both or either one of the first FBG 5 or the second FBG 7. The range with comparatively good efficiency is from 1060 nm to 1090 nm, and the wavelength of 1064 nm same as Nd:YAG laser is often used.

For the rare earth element doped to the amplifying optical fiber 6, Er or Nd, etc. as well as Yb may be used, and not only one type of element but also the combination of two or more types of element such as the combination of Yb and Er may be used.

Regarding the wavelength of the amplified light 13, the reflectance of the first FBG 5 is set to nearly 100% and the reflectance of the second FBG 7 is set to an arbitrary value below 100%. The amplified light 13 amplified by the amplifying optical fiber 6 is repeatedly resonated at the area between the first FBG 5 and the second FBG 7, and a part of the amplified light 13 passed through the second FBG 7 is output to the outside as the output light 14c from a fiber outputting element (collimator) 8.

In the fiber laser modulator 1 of the embodiment configured as above description, the LD output light 12 is modulated based on the pattern signal 11 generated by the pattern generator 2, and when the modulated LD output light 12 is input to the amplifying optical fiber 6, the laser light amplified a predetermined wavelength is output to an outside from the fiber outputting element 8.

Figure 2:
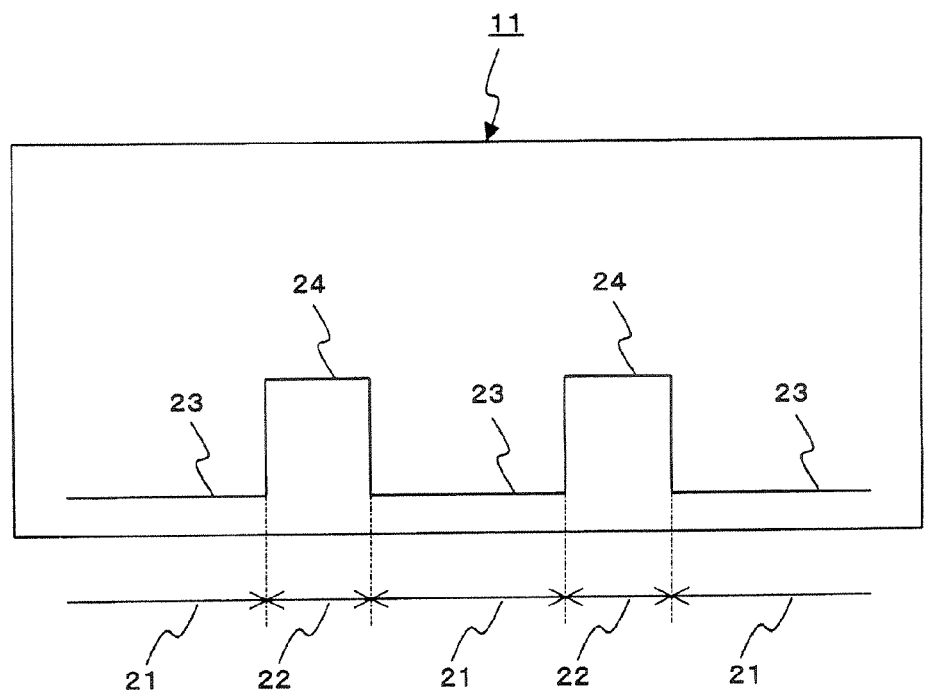
FIG. 2 is a diagram showing one embodiment of conventional pattern signal 11.

Here, as the pattern signal 11, the waveform of the output light 14 in the case where a rectangular wave including two out put levels 23, 24 of an idling phase 21 and an power outputting phase 22 as shown in FIG. 2 is described as followings. The pattern signal 11 will be indicated as the electric current value which is supplied to the semiconductor laser 3, and the power level of the pattern signal 11 is the electric current value which is supplied to the semiconductor laser 3.

Figure 3:
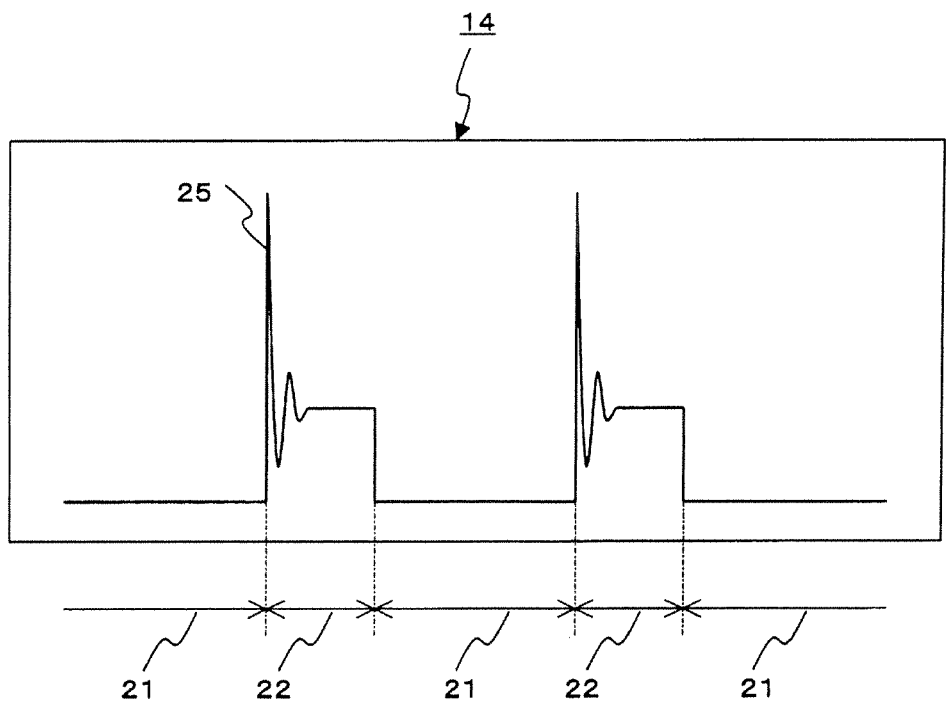
FIG. 3 is a diagram showing one example of a output light 14 following a surge pulse 25 when using conventional pattern signal 11.

The pattern signal 11 shown in FIG. 2, with setting the power level 23 of the idling phase 21 to zero, steppedly increases the power level from zero to the predetermined power level 24 when reaching the power outputting phase 22. When using the rectangular wave pattern signal 11 shown in FIG. 2, the output light 14 irradiated from the fiber outputting element 8 becomes the waveform following the surge pulse 25 as shown in FIG. 3.

In order to use the output light 14, for example for the light source for the display, it is necessary to make a substantially rectangular waveform not following the surge pulse 25. However, if the rectangular wave pattern signal 11 shown in FIG. 2 that was conventionally used for the fiber laser is used, the output light 14 will be the waveform following the surge pulse 25 shown in FIG. 3.

Figure 4:
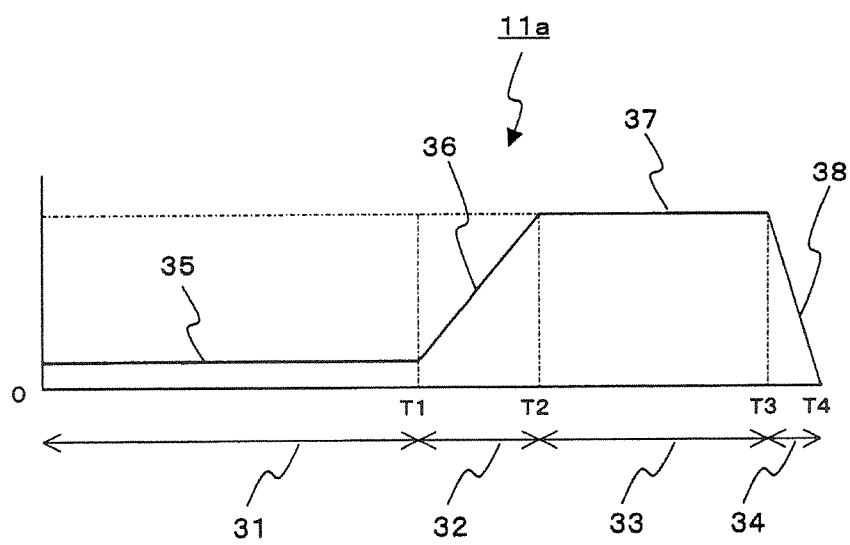
FIG. 4 is a diagram showing one embodiment of a pattern signal 11a including:low powered phase, power rising phase and high power phase of the present invention.

Accordingly, in order to make output light 14 to be a rectangular pulsed light not following the surge pulse, the fiber laser modulator 1 of this embodiment is configured to form pattern signal 11 produced by the pattern generator 2 in a four-phase power level: low powered phase; power rising phase; high power phase: and power decreasing phase. One embodiment of the pattern signal 11 is shown in FIG. 4. The pattern signal 11a shown in this figure, the idling phase 21 shown in FIG. 2 is separated into the low powered phase 31 and the power rising phase 32, and power outputting phase 22 to the high power phase 33 and power decreasing phase 34.

In FIG. 4, the low power level 35 in the low powered phase 31 is determined to be greater than zero and the output light 14 is equal or less than the predetermined threshold. In addition, the high power level 37 in the high power phase 33 is determined such that the output light 14 matches with the predetermined required power level. Furthermore, the power level 36 in the power rising phase 32 is determined so as to rise in the certain rising rate from the low power level 35 to the high power level 37. Additionally, the decreasing power level 38 in the power decreasing phase 34 is determined so as to decrease in the certain decreasing rate from the high power level 35 to the low power level 37.

It is preferred that the above-mentioned predetermined threshold is a some proper level for forming a population inversion at a part of the amplifying optical fiber length. In this manner, by providing a certain population inversion condition to a part of the amplifying fiber, preventing the relaxation oscillation generation due to rapid pump light adoption becomes possible. But depending on application of the laser modulator of the present invention as described later, setting the above threshold higher is also possible.

Figure 5:
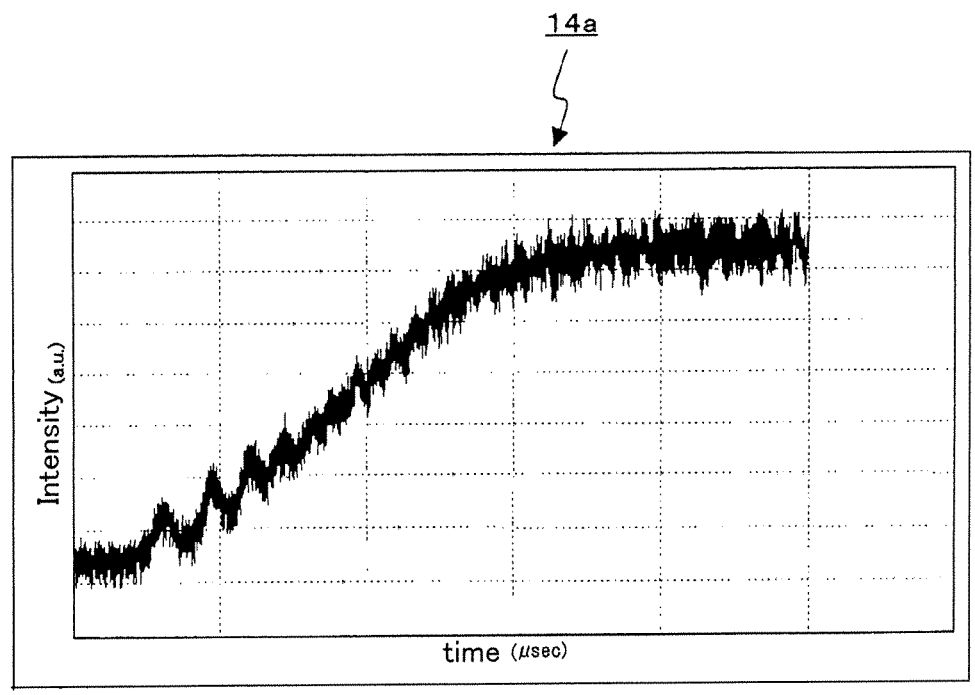
FIG. 5 is a diagram showing one example of the output light 14 using the pattern signal 11a of the present invention.

One example of the output light 14 using the pattern signal 11a shown in FIG. 4 is illustrated in FIG. 5. In this embodiment, 10 m-long amplifying optical fiber 6 is used, and the frequency of the pattern signal 11a is 1 kHz (cycle T4 is 1 msec), the output light 14 in the high power phase 33 which is required power level is 5 W, high power phase 33 is one-third of the cycle T4 (duty ratio:⅓). FIG. 5 shows a zoom-in diagram of the output light 14 within before and after 100 μsecpower rising from the output light 14 produced based on the pattern signal 11a.

The output light 14a shown in FIG. 5 is a substantially rectangular waveform not following the surge pulse. Moreover, by setting the pattern including low powered phase 31, power rising phase 32, high power phase 33 and the power decreasing phase 34 shown in FIG. 4 as one cycle, this can be used as the sequentially generated pulsed light. In this case, the pulsed light sequentially irradiating the output light 14a shown in FIG. 5 can be obtained. Such substantially rectangular pulsed light not following the surge pulse shown in FIG. 5 can be used for such as the light source for the display.

As above-mentioned, in the fiber laser modulator 1 in this embodiment, by using the pattern signal 11a like shown in FIG. 4 to the pattern generator 2, substantially rectangular output light 14a not following the surge pulse such like shown in FIG. 5 could be obtained. The pattern signal 11a shown in FIG. 4 sets the power level to the low power level 35 greater than zero in the low powered phase 31 not letting generate the rectangular wave.

By using the pattern signal 11a shown in FIG. 4, conditions to obtain the output light 14a having substantially rectangular waveform not following the surge pulse are described as below. In order to obtain the output light 14a having substantially rectangular waveform not following the surge pulse, it is important to set the power rising phase 32 to be longer than a predetermined time, and setting this time length over 10 μsec is preferred. In addition, the high power phase 33 is set as one-third of the cycle T4 in the embodiment of FIG. 5, this can be, for example around half of the cycle T4. For the output light 14 in the high power phase 33 as the required power level, by setting it equal or less than 5 W, the output light 14 not following the surge pulse can be obtained. Furthermore, the output light 14 in the low powered phase 31 is 30 mW or more and the ratio to output light 14 in the high power phase 33 (hereinafter, refer to extinction ratio) does not become 10 dB or less is preferred.

In the embodiment shown in FIG. 5, the frequency was 1 kHz (cycle T4 is 1 msec), and higher frequency is also possible. But since it is necessary to keep the range where at least the over 10 μsec of the power rising phase 32 is implemented, the upper limit have to be below 100 kHz. Off course, the required high power phase 33 defines the upper limit of the frequency. In the case where the requirement to the extinction ratio can be eased, setting the threshold to the output light 14 in the low powered phase 31 be higher, and setting the power rising phase 32 as shorter than 10 μsec to further increase the frequency is also possible.

When using the pattern signal 11a such like shown in FIG. 4, if setting the required power level of the output light 14a being high, the power level of the output light 14a in the low powered phase 31 becomes high accordingly. Therefore, when the power level of the output light 14a in the low powered phase 31 exceeds the threshold, the pattern signal 11a shown in FIG. 4 cannot be used.

Figure 6:
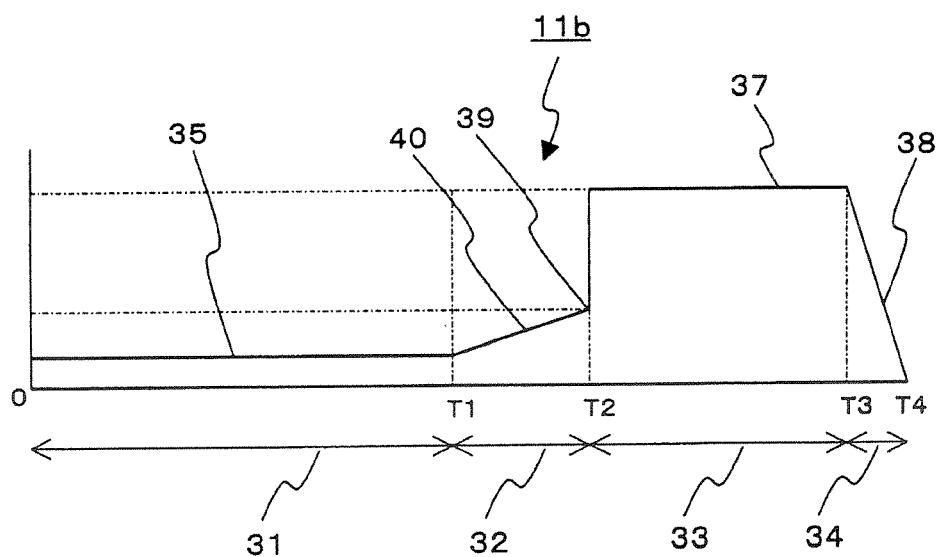
FIG. 6 is a diagram showing one embodiment of the pattern signal 11a having another shape of the present invention.

According to the present invention, by using the pattern signal 11a shown in FIG. 4, when the power level of the output light 14a in the low powered phase 31 exceeds the threshold, as the pattern signal 11a, the pattern signal 11b with another shape shown in FIG. 6 can be used.

In the pattern signal 11b shown in FIG. 6, a medium power level 39 which is higher than low power level 35 and lower than high power level 37 is provided, and the rise of a rising power level 40 in the power rising phase 32 is determined to rise in a certain rising rate from the low power level 35 to the medium power level 39. And after reaching the medium power level 39, the power level is stepedly raised from the medium power level 39 to the high power level 37 at the start of the high power phase 33.

It is preferred that the medium power level is the level for example that forms the population inversion by the entire of the amplifying optical fiber length. In this manner, the entire amplifying optical fiber length gives the population inversion condition, which more surely prevents the occurrence of relaxation oscillation brought by rapid population inversion formation even if stronger pump light power is injected in a short time, and enables to restrain the occurrence of surge pulse efficiently when a large power pulse is generated.

Figure 7:
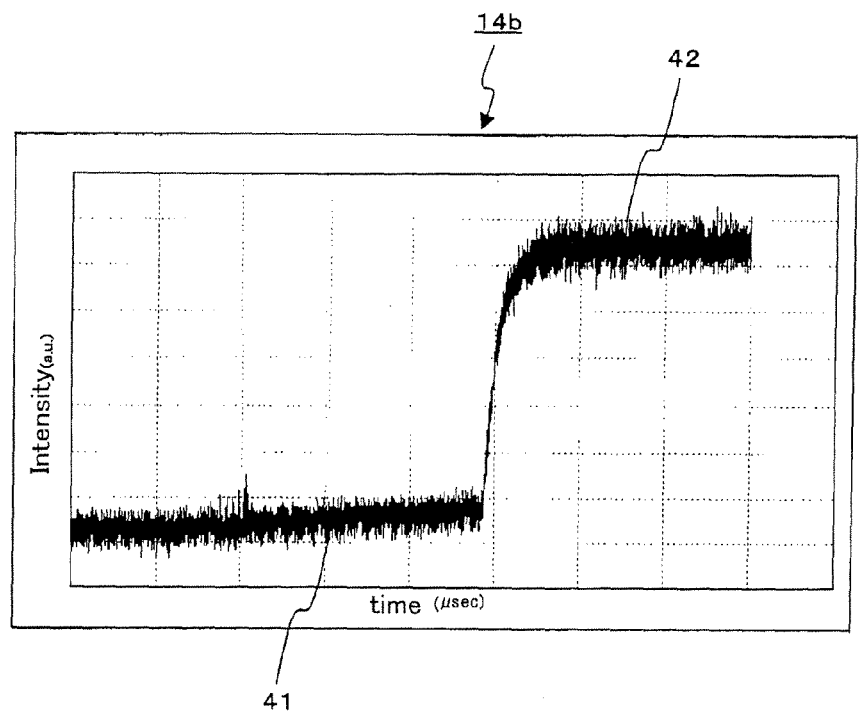
FIG. 7 is a diagram showing one example of an output light 14b using another pattern signal 11b of the present invention.

FIG. 7 illustrates one embodiment of the output light 14 obtained by use of the pattern signal 11b shown in FIG. 6. In this embodiment, the amplifying optical fiber 6 having a length of 20 m is used and the frequency of the pattern signal 11b is 1 kHz (cycle T4 is 1 msec), the output light 14 in the high power phase 33 that is the required power level is 20 W, the high power phase 33 is one-third of the cycle T4 (duty ratio ⅓). FIG. 7 shows a enlarged diagram of the output light 14 during before and after 400 μsec power rising from the output light 14 produced based on the pattern signal 11b. In this drawing, the high power level 42 of the output light 14b in the high power phase 33 is set four times higher than the case of the embodiment shown in FIG. 4. Meanwhile, the low power level 41 in the low powered phase 31 is restricted such that the output light 14a in FIG. 5 is almost same level of the output light 14b in FIG. 7.

By using the pattern signal 11b shown in FIG. 6, conditions to obtain the output light 14b having a substantially rectangular waveform not following the surge pulse is described as followings. In order to obtain a rectangular waveform output light 14b not following the surge pulse, setting the medium power level 39 is important, and when the high power level 42 in the output light 14 that is the required power level is 20 W, by setting the output light 14 at the medium power level 39 to about 1 W or more, the occurrence of the surge pulse is efficiently restrained.

Additionally, in order to set the high power level 42 to above 20 W, setting the output light 14 at the medium power level 39 to above 1 W implements the condition, and in order to set the high power level 42 to below 20 W, the output light 14 at the medium power level 39 can be set to below 1 W.

Furthermore, it is preferred that the power rising phase 32 is set over 100 μsec, in the embodiment shown in FIG. 7, set to 200 μsec. The high power phase 33 was one-third of the cycle T4 in the embodiment of FIG. 7, it may be, for example around half of the cycle T4. Also, the output light 14 in the low powered phase 31 is about 20 mW or more, more preferably 100 mW or more, and the output within the range that the extinction ratio goes to 10 dB or less is preferred.

In the embodiment shown in FIG. 7, the frequency is 1 kHz (cycle T4 is 1 msec) as well, which can be set much higher. But, it is necessary that the range is capable of keeping at least over 100 μsec in the power rising phase 32, so that the frequency should be below 10 kHz at maximum. Definitely, the time length of the required high power phase 33 defines the upper limit of the frequency. In the case where the requirement to the extinction ratio can be eased, setting the output light 14 in the low powered phase 31 higher, and setting the power rising phase 32 as shorter than 100 μsec to further increase the frequency is also possible.

Figure 8:
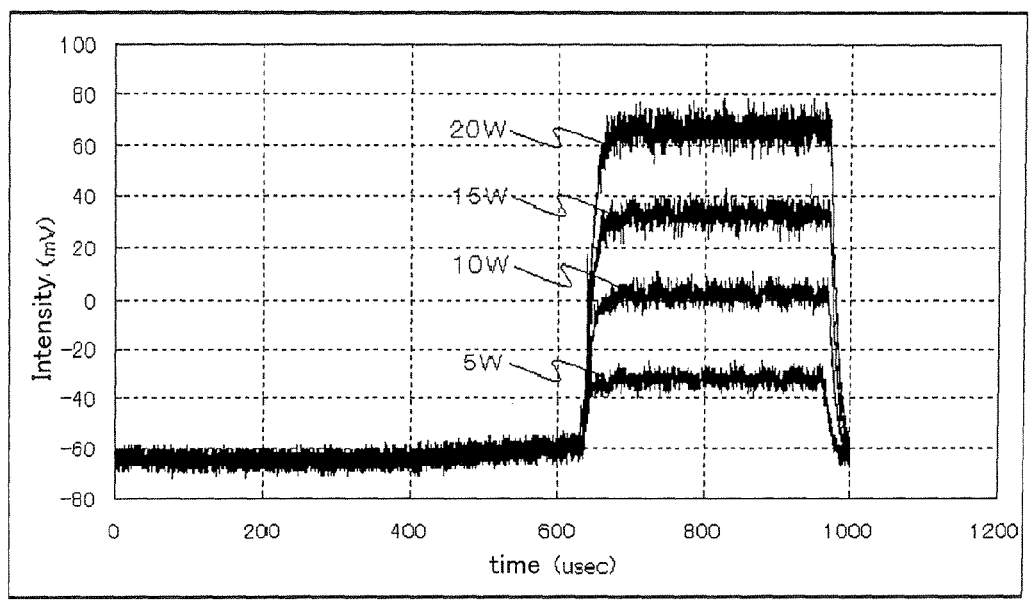
FIG. 8 is a diagram showing another example of the output light 14b using another pattern signal 11b of the present invention.

FIG. 8 illustrates another embodiment carried out the laser modulation by using the pattern signal 11b shown in FIG. 6. In this embodiment, by using the pattern signal 11b of which the strip length of the amplifying optical fiber 6 is 40 m, the output light 14 in the low powered phase 31 is 100 mW, and the output light 14 in the medium power level 39 is 1 W, pulse oscillation is carried out with a frequency of 1 kHz. Here, the duty ratio is set to one-third, that is, the high power phase 33 is set to 333 μsec, and the power rising phase 32 is set to 267 μsec. FIG. 8 shows the output waveform when setting the output light 14 in the high power phase 33 from 5 W to 20 W by use of such pattern signal 11b.

From the result shown in FIG. 8, by setting the power rising phase 32 to 267 μsec or more and the output light 14 in the medium power level 39 to 1 W, the acquisition of the rectangular wave output light 14 without generating surge pulse within a wide range from 5 W to 20 W could be observed.

From the above result, by using the pattern signal 11a or 11b having the predetermined period of power rising phase in substitute of step pattern signal 11, the rectangular wave output light 14 not following the surge pulse can be obtained. In addition, by setting the medium power level 39 of the pattern signal 11b properly, higher out put than the rectangular wave output light 14 not following the surge pulse can be obtained.

The high power level 37 is not limited in the output scope described in above embodiments. For example, in the fiber laser with around 100 mW high power level 37, by setting the low power level to a predetermined threshold such as around 1 mW, and the medium power level, if necessary, a part of the amplifying fiber is given the population inversion condition and the surge pulse is restrained similar to above embodiments.

Figure 9:
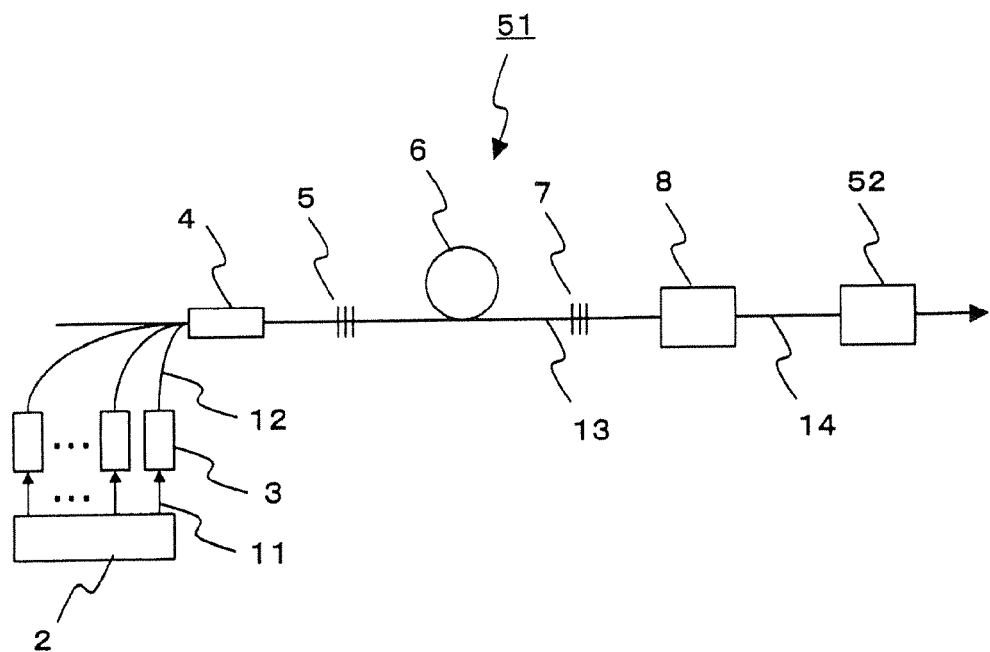
FIG. 9 is a diagram showing a structure outline of a fiber laser modulator 51 with respect to another embodiment of the present invention.

The out line structure of the fiber laser modulator with respect to another embodiment of the present invention is shown in FIG. 9. A fiber laser modulator 51 is added a SHG element 52 which is a wavelength converting element to downstream side of the fiber outputting element 8 in the fiber laser modulator 1 shown in FIG. 1.

The SHG element 52 is a means for generating second harmonic by use of a nonlinear optical crystal, for example the output light 14 with a wavelength of 1064 nm is input from the fiber outputting element 8, a green light with a wavelength of 532 nm is generated. In other word, using the SHG element 52 enables making half length of the input light wavelength and generating double energy.

For the SHG element 52, there are a bulk type used for high light input around 1 W or more (bulk type wavelength conversing element) and a waveguide type used for comparatively low light input lower than that (waveguide type wavelength conversing element). For the fiber laser with around 1 W or more high power level 37 as shown in above-mentioned embodiment, using the bulk type wavelength conversing element is preferable, and for the fiber laser with around 1 W or less high power level 37 such as around 100 mW, using the waveguide type wavelength conversing element is suitable.

Figure 10:
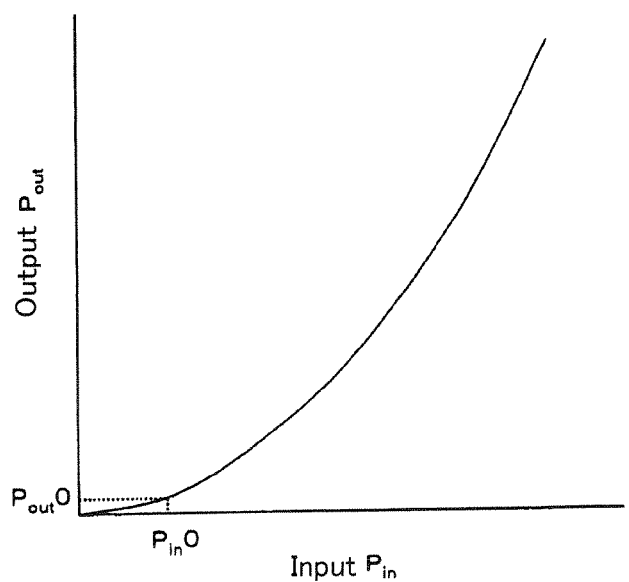
FIG. 10 is a diagram showing one example of the output characteristics of a SHG element 52.

The SHG element 52 has the characteristics of the following formula shown in FIG. 10 between the output of the input light (refer to Pin) and the output of the output light (refer to Pout)

$$Pout \propto Pin^2$$

From above formula, when Pin is sufficiently small, Pout can regard as nearly zero. Then, when the upper limit of Pin where Pout can regard as substantially zero is Pin0, Pin0 can be used for the threshold. When setting the threshold like this, the fiber laser modulator 51 generates green light only in the high power phase 33 of the output light 14.

By using above relation between Pin and Pout, a method for easing the restriction for output light 14 in low powered phase 31 by the SHG element 52 is described hereinafter. As the ratio of the low power level Pout-L for the high power level Pout-H in the output side of the SHG element 52 is extinction ratio, it is defined as Pout-L/Pout-H and $-10 \log_{10}$ (Pout-L/Pout-H) (dB), as well as in the input side, the extinction ratio of the low power level Pout-L for the high power level Pout-H in the output side of the SHG element 52 is defined as Pout-L/Pout-H and $-10 \log_{10}$ (Pout-L/Pout-H) (dB), the relation of the extinction ratio between the input side and the output side of the SHG element 52 is described.

From the above relation expression between Pin and Pout, Pout-L/Pout-H=(Pin-L/Pin-H)$^2$, or (Pout-L/Pout-H)$^{1/2}$=Pin-L/Pin-H are satisfied. In other word, it means that the extinction ratio at the output side is expressed by the square of the extinction ratio at the input side. Or the extinction ratio at the input side is expressed by the square root of the extinction ratio at the output side.

Thereafter, suppose the power level at the output side of the SHG element 52 which Pout is regard as substantially zero is the power level satisfying the required extinction ratio, by using above relation, the extinction ratio at the input side of the SHG element 52, that is the extinction ratio of the fiber outputting element 8, may be the extent to be expressed by the square root of the extinction ratio. For example, suppose the required extinction ratio is 20 dB in logarithmic description, the extinction ratio of the fiber outputting element 8 may be 10 dB, which is the square root of 20 dB. In this manner, using the SHG element 52 is capable of easing the requirement for the extinction ratio of the fiber outputting. Consequently, making output light 14 in low powered phase 31 and medium power level 39 is enabled, so that the condition difficult to generate surge pulse can be set much easier.

This shows that the required condition about the extinction ratio at the output side of the SHG element 52 determines the threshold for the extinction ratio at the input side which is required to prevent surge pulse and the low power level, thereby as a pattern signal 11, 11a or 11b can be selected appropriately.

As further fiber laser modulator embodiment of the present invention, in the fiber laser modulator 1 shown in FIG. 1 or the fiber laser modulator 51 shown in FIG. 9, there is a structure that the second FBG 7 is accommodated in a temperature compensating package.

By accommodating the second FBG 7 for discriminating wavelength in the temperature compensating package, stabilizing the wavelength of the output light 14 reaching to the fiber outputting element 8 passing through the second FBG 7 can be implemented. Furthermore, by controlling the temperature of the second FBG 7, making the wavelength of the output light 14 variable can also be implemented.

The preferred embodiments showing an example of fiber laser modulation method and modulator with respect to the present invention is described, but are not limited to them. In an appropriate manner, changes can be made in detail structure and operation of the fiber laser modulation method and modulator in the preferred embodiment within the scope of the present invention.

According to the description above, the present invention can provide the fiber laser modulation method and modulator for producing rectangular pulsed light not following the surge pulse by optimizing the input pattern of the pump light source.

Also according to the invention, further including the SHG element enables the generation of the rectangular green light, which provides the effect to expand the application of the laser light such like it can be used as the light source of the display and various analyzing units.

The present invention is not limited to the above described embodiments, and various variations and modifications may be possible without departing from the scope of the present invention.

This application is based on the Japanese Patent application No. 2005-303265 filed on Oct. 18, 2005, entire content of which is expressly incorporated by reference herein.

What is claimed is:

1. A fiber laser modulation method for modulating a pump light as an input light to an amplifying optical fiber to output a predetermined output light comprising the steps of:

forming a pattern of said input light based on a pattern signal in a power level of four phases including a fixed level of a low powered phase, a fixed rising rate of a power rising phase, the power rising phase lasting 10 micro seconds or more, a fixed level of a high power phase and a fixed decreasing rate of a power decreasing phase;

setting a power level of said high power phase as a predetermined high power level such that said output light is determined to match with a predetermined required power level;

setting a power level of said low powered phase so as to be greater than zero and such that a predetermined low power level is determined that said output light is equal to or less than a predetermined threshold;

raising the power level of said power rising phase between said low power level and said high power level in a predetermined rising rate; and decreasing the power level of said power decreasing phase between said high power level and said low power level in a predetermined decreasing rate to produce a rectangular pulsed light without a surge pulse.

2. The fiber laser modulation method according to claim 1, wherein a predetermined medium power level which is higher than said low power level as well as lower than said high power level is set, the power level of said power rising phase is raised from said low power level to the said medium power level in a certain rising rate, and at an end of said power rising phase, is raised from said medium power level to said high power level instantaneously.

3. The fiber laser modulation method according to claim 1, wherein by inputting said output light to an SHG element (Second Harmonic Generation element), a wavelength of said output light is decreased to be a half while making the power level in said low powered phase to be substantially zero.

4. The fiber laser modulation method according to claim 1, wherein said output light has rectangular waveform.

5. The fiber laser modulation method according to claim 1, wherein said output light is a pulsed light having a low powered phase, a power rising phase, a high power phase and a power decreasing phase as one cycle.

6. A fiber laser modulator comprising:

a pattern generator for producing an input pattern including a fixed level of a low powered phase, a fixed rising rate of a power rising phase, the fixed rising rate lasting for 10 micro seconds or longer, a fixed level of a high power phase and a fixed decreasing rate of a power decreasing phase;

a pump light source for outputting pump light by inputting said input pattern from said pattern generator;

a first FBG (Fiber Bragg Grating) for permitting said pump light to pass from said pump light source while reflecting an amplifying light from an opposite direction;

an optical fiber to couple the pump light source and the first FBG;

an amplifying optical fiber for outputting the amplifying light of a predetermined wavelength, by excitement due to said pump light which is input through said first FBG;

a second FBG for permitting a part of said amplifying light transmitted within the optical fiber to pass and reflecting the rest of the light; and a fiber outputting element for outputting said amplifying light passed through said the second FBG to outside of an immediate area of the amplifying fiber.

7. A fiber laser modulator according to claim 6 further including an SHG (second harmonic generation) element.

8. A fiber laser modulator according to claim 6 or 7, wherein said pump light source is a semiconductor laser for generating a laser light with a wavelength of from 900 to 1000 nm.

9. A fiber laser modulator according to claim 8, wherein said amplifying optical fiber is a double clad fiber with at least one of Yb, Er and Nd doped.

10. A fiber laser modulator according to claim 7, wherein the output light from said SHG element is a green light.

* * * * *